(12) United States Patent
Kato et al.

(10) Patent No.: US 11,539,059 B2
(45) Date of Patent: Dec. 27, 2022

(54) FUEL CELL SYSTEM

(71) Applicants: AISIN CORPORATION, Kariya (JP); DIC Corporation, Tokyo (JP)

(72) Inventors: Satoshi Kato, Kariya (JP); Takeshi Kitamura, Kariya (JP); Tomomichi Kanda, Ichihara (JP); Takamichi Aoki, Ichihara (JP)

(73) Assignees: AISIN CORPORATION, Kariya (JP); DIC Corporation, Tokyo (JP)

( * ) Notice: Subject to any disclaimer, the term of this patent is extended or adjusted under 35 U.S.C. 154(b) by 0 days.

(21) Appl. No.: 17/499,108

(22) Filed: Oct. 12, 2021

(65) Prior Publication Data
US 2022/0131164 A1    Apr. 28, 2022

(30) Foreign Application Priority Data

Oct. 27, 2020  (JP) .............................. JP2020-179596

(51) Int. Cl.
*H01M 8/04089*    (2016.01)
*H01M 8/0612*    (2016.01)
*H01M 8/0662*    (2016.01)

(52) U.S. Cl.
CPC ..... *H01M 8/04097* (2013.01); *H01M 8/0618* (2013.01); *H01M 8/0675* (2013.01)

(58) Field of Classification Search
CPC ................................................. H01M 8/04097
See application file for complete search history.

(56) References Cited

FOREIGN PATENT DOCUMENTS

| EP | 2 963 720 A1 | 1/2016 |
|---|---|---|
| JP | 2014-61 485 A | 4/2014 |
| JP | 2016-12486 A | 1/2016 |

*Primary Examiner* — Brian R Ohara
(74) *Attorney, Agent, or Firm* — Oblon, McClelland, Maier & Neustadt, L.L.P.

(57) ABSTRACT

A fuel cell system includes a reformer, a fuel cell, a desulfurizer, a recirculation passage through which the reformer communicates with the desulfurizer such that a part of the anode gas generated in the reformer flows into the desulfurizer, and an orifice member provided on the recirculation passage. The orifice member or at least a part of an inner wall of a portion that constitutes an upstream side from the orifice member in the recirculation passage is made of a material containing a material having an antifungal action.

4 Claims, 2 Drawing Sheets

FUEL CELL SYSTEM

CROSS-REFERENCE TO RELATED APPLICATION

This application claims priority to Japanese Patent Application No. 2020-179596 filed on Oct. 27, 2020, incorporated herein by reference in its entire.

BACKGROUND

1. Technical Field

The present disclosure relates to a fuel cell system.

2. Description of Related Art

The fuel cell system (fuel cell cogeneration system) disclosed in Japanese Unexamined Patent Application Publication No. 2016-012486 (JP 2016-012486 A) includes a desulfurizer that desulfurizes fuel gas and a reformer that generates anode gas containing a hydrogen gas by reacting the fuel gas desulfurized in the desulfurizer with water vapor. The fuel cell system further includes a recirculation passage for introducing a part of the anode gas generated in the reformer into the desulfurizer and is configured to desulfurize the fuel gas using hydrogen contained in the anode gas.

By the way, a piping for supplying fuel gas to the reformer may be opened to the atmosphere in a period between the time when the fuel cell system is manufactured and the time when the fuel cell system is installed at the site of use. Through the opened piping, oxygen and fungi, such as mold, may invade the inside of the recirculation passage. In addition, since water vapor that has not reacted in the reformer also flows in the recirculation passage, the water vapor may condense and the condensed water may accumulate inside the recirculation passage. Therefore, the inside of the recirculation passage is an environment in which mold can easily proliferate. Then, a proliferation of the mold invaded the inside of the recirculation passage may hinder the flow of the anode gas to reduce the amount of hydrogen to be introduced into the desulfurizer through the recirculation passage. In particular, in the case where an orifice member is provided on the recirculation passage, condensed water may accumulate in a passage hole of the orifice member, and thus the mold proliferated in the passage hole may block the passage hole. As a result, sufficient hydrogen may not be supplied to the desulfurizer, and the desulfurization of the fuel gas may be insufficient.

SUMMARY

The present disclosure provides a fuel cell system having a recirculation passage for introducing a part of the anode gas generated in a reformer into a desulfurizer, in which the blockage of the recirculation passage by the mold is prevented or suppressed.

An aspect of the disclosure relates to a fuel cell system including a reformer, a fuel gas passage, a fuel cell, a desulfurizer, a recirculation passage, and an orifice member. The reformer is configured to generate an anode gas containing hydrogen by reacting fuel gas with water vapor. The fuel gas passage is for supply of the fuel gas to the reformer. The fuel cell is configured to generate electrochemically reacting oxygen with the anode gas generated by the reformer. The desulfurizer is provided on the fuel gas passage and is configured to desulfurize the fuel gas flowing through the fuel gas passage using hydrogen. The recirculation passage through which the reformer communicates with the desulfurizer such that a part of the anode gas generated in the reformer flows into the desulfurizer. The orifice member is provided on the recirculation passage. The orifice member or at least a part of the inner wall of a portion that constitutes an upstream side from the orifice member in the recirculation passage is made of a material containing a material having an antifungal action.

With the fuel cell system according to the aspect, the orifice member provided in the recirculation passage or at least a part of the inner wall of the portion on the upstream side from the orifice member in the recirculation passage is made of a material containing the material having the antifungal action; therefore, a proliferation of a mold may be suppressed in the orifice member provided on the recirculation passage or in the region on the upstream side from the orifice member in the recirculation passage. As a result, the blockage of the recirculation passage by the proliferated mold is prevented or suppressed.

In the fuel cell system according to the aspect, the material having the antifungal action is a material having one or both of an action of suppressing the proliferation of mold (fungus) and an action of killing the mold. Hereinafter, a material having an antifungal action may be referred to as an antifungal material.

In the fuel cell system according to the aspect, the orifice member may be made of a material containing the material having the antifungal action.

In the fuel cell system according to the aspect, the orifice member may be made of a glass fiber reinforced resin containing the material having the antifungal action.

In the fuel cell system according to the aspect, the material having the antifungal action may be made of glass powder containing silver ions.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described. The fuel cell system according to the embodiment of the present disclosure is a gas cogeneration system that uses city gas, propane gas, or the like as fuel gas to cogenerate electricity and heat. In the following description, the fuel cell system according to the embodiment of the present disclosure may be abbreviated as "the present system".

Figure 1:
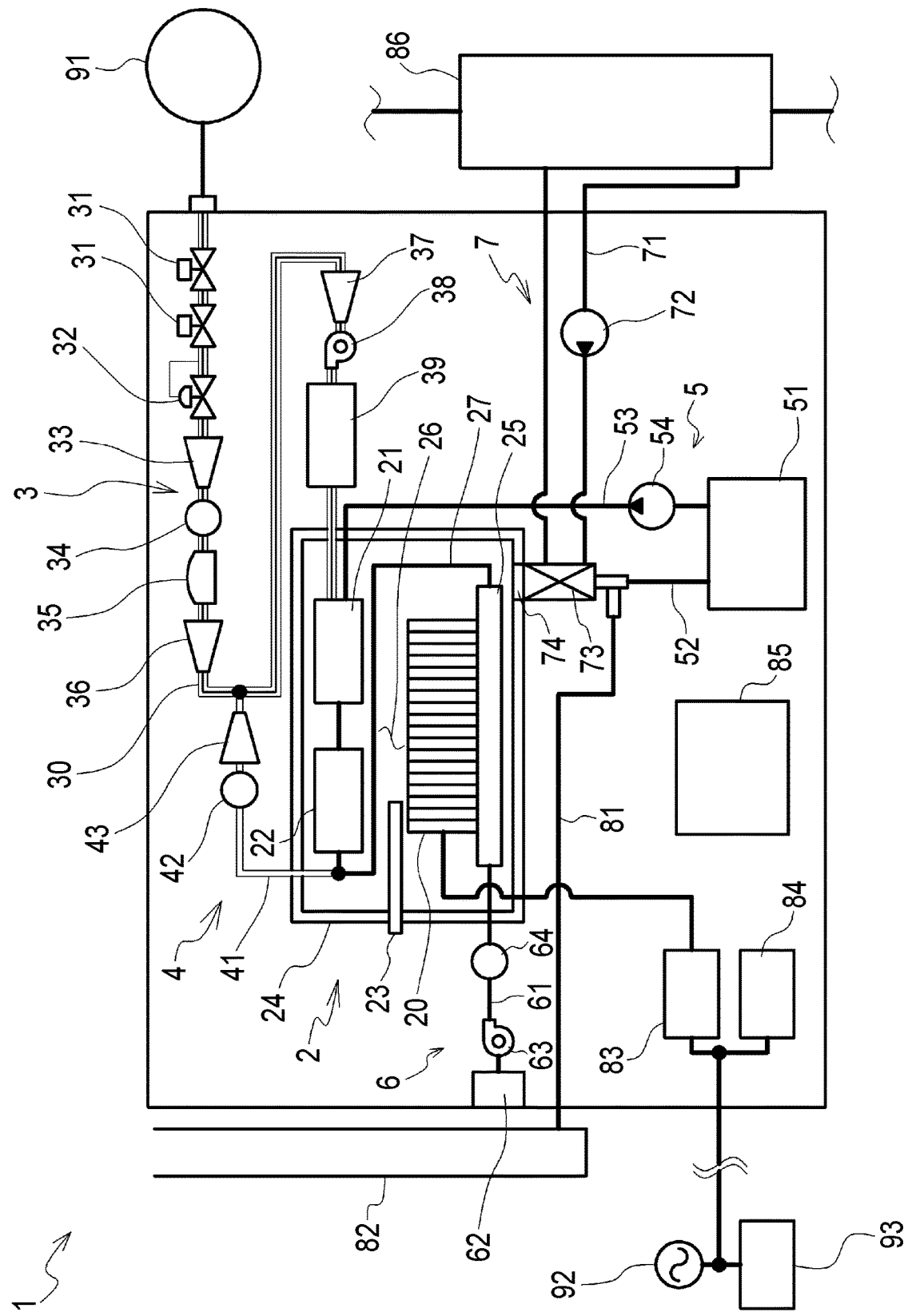
FIG. 1 is a diagram showing a configuration of a fuel cell system.

FIG. 1 is a diagram showing a schematic configuration of the present system 1. As shown in FIG. 1, the present system 1 includes a power generation module 2, a fuel gas supply system 3, a recirculation system 4, a reformed water supply system 5, an air supply system 6, and an exhaust heat recovery system 7 (sometimes, referred to as a hot water supply system), a power conditioner 83, a power supply device 84, a control device 85, and a hot water storage tank 86.

The power generation module 2 includes a fuel cell 20, a vaporizer 21, a reformer 22, and a spark plug 23. The fuel cell 20, the vaporizer 21, the reformer 22, and the spark plug 23 are arranged inside a module case 24 formed of a heat insulating material.

The fuel cell 20 of the power generation module 2 is a solid oxide fuel cell. The solid oxide fuel cell includes a cell stack composed of a plurality of stacked cells. Each cell composing the cell stack includes an anode electrode, a cathode electrode, and a solid electrolyte, such as zirconium oxide, sandwiched between the anode electrode and the cathode electrode. On the anode electrode side of each cell, an anode gas passage for circulating the anode gas is provided to extend in a direction orthogonal to the stacking direction of each cell. On the cathode electrode side of each cell, an air passage for a circulation of the air that is a cathode gas is provided to extend in a direction orthogonal to the stacking direction of each cell. When the anode gas is supplied to the anode gas passage of each cell and the air that is the cathode gas is supplied to the air passage of each cell, the anode gas reacts with oxygen in the cathode gas. The fuel cell 20 generates electricity by the reaction and outputs direct current power.

The cell stack of the fuel cell 20 is arranged on the manifold 25. The manifold 25 includes an anode gas passage and an air passage (not shown). The anode gas passage of the manifold 25 is connected to the anode gas supply passage 27 and the anode gas passage of each cell. In addition, the anode gas passage of the manifold 25 is configured so that the anode gas supplied from the reformer 22 through the anode gas supply passage 27 can be supplied to the anode gas passage of each cell. The air passage of the manifold 25 is connected to the air passage of each cell of the cell stack and the air supply passage 61 of the air supply system 6. In addition, the air passage of the manifold 25 is configured so that the air supplied through the air supply passage 61 can be supplied to the air passage of each cell.

The vaporizer 21 and the reformer 22 are arranged above the cell stack of the fuel cell 20 and are separated from the cell stack. A combustion part 26 is provided between the cell stack and both the vaporizer 21 and the reformer 22. The combustion part 26 is a region for combusting an anode gas that is not used for generating electricity (electrochemical reaction) (hereinafter, referred to as "anode off gas") in the cell stack. A spark plug 23 for igniting the anode off gas is arranged in the combustion part 26.

The inlet of the vaporizer 21 is connected to the fuel gas supply passage 30 of the fuel gas supply system 3 and the reformed water supply passage 53 of the reformed water supply system 5. The outlet of the vaporizer 21 is connected to the inlet of the reformer 22. The vaporizer 21 is configured to preheat the fuel gas supplied to the inside thereof and simultaneously to heat the reformed water supplied to the inside thereof through the reformed water supply passage 53 to generate water vapor, by the heat generated by the combustion of the anode off gas in the combustion part 26.

The reformer 22 is configured to generate an anode gas containing hydrogen from the fuel gas and water vapor. Note that, in the present specification, an anode gas means a gas generated by a reformer 22. The reformer 22 includes, for example, a Ru reforming catalyst or Ni reforming catalyst. When fuel gas and water vapor are supplied from the vaporizer 21 to the inside of the reformer 22, hydrogen gas and carbon monoxide are generated by the water vapor reforming reaction between the fuel gas and the water vapor. Furthermore, hydrogen gas and carbon dioxide are produced by the carbon monoxide shift reaction between the produced carbon monoxide and water vapor. Thus, the anode gas generated in the reformer 22 contains hydrogen, carbon monoxide, and carbon dioxide. The gas discharged from the reformer 22 contains water vapor and fuel gas that did not contribute to the reforming reaction, in addition to the anode gas. The outlet of the reformer 22 is connected to an anode gas supply passage 27 for supplying the anode gas containing the generated hydrogen to the fuel cell 20. Therefore, the anode gas containing hydrogen generated in the reformer 22 can be supplied to the anode gas passage on the anode electrode side of the fuel cell 20 through the anode gas supply passage 27.

The fuel gas supply system 3 is configured to supply the fuel gas supplied from the fuel gas supply source 91 outside the present system 1 to the vaporizer 21 of the power generation module 2. The fuel gas supply system 3 includes a fuel gas supply passage 30. A first end of the fuel gas supply passage 30 is connected to the vaporizer 21, and a second end is configured to be connectable to the fuel gas supply source 91 outside the present system 1. The fuel gas supply passage 30 is provided with an inlet solenoid valve 31, a regulating valve 32, a first orifice member 33, a fuel gas flow meter 34, a zero governor 35, a second orifice member 36, a third orifice member 37, a fuel gas blower 38, and the desulfurizer 39 in this order from the side of the second end portion configured to be connectable to the fuel gas supply source 91.

The inlet solenoid valve 31 is a valve (double valve) capable of opening and closing the fuel gas supply passage 30. The inlet solenoid valve 31 is controlled to be opened and closed by the control device 85.

The regulating valve 32 is a valve for regulating the internal pressure of the fuel gas supply passage 30 and is configured to regulate the pressure of the fuel gas flowing into the fuel gas supply passage 30 from the fuel gas supply source 91 to flow out the fuel gas to the downstream side (the side on which the desulfurizer 39 and fuel gas blower 38 are arranged) of the regulating valve 32. Specifically, the regulating valve 32 is configured to be opened when the pressure on the downstream side thereof is equal to or lower than a predetermined negative pressure, and is configured to be closed when the pressure on the downstream side thereof is higher than the predetermined negative pressure. The regulating valve 32 is arranged on the side close to the second end portion configured to be connectable to the fuel gas supply source 91 than the position of the portion of the fuel gas supply passage 30 to which the recirculation passage 41 described below is connected, that is, on the upstream side.

The fuel gas flow meter 34 measures the flow rate of the fuel gas. The flow rate of the fuel gas measured by the fuel gas flow meter 34 is transmitted to the control device 85. The zero governor 35 absorbs fluctuation of the pressure (supply pressure) of the fuel gas supplied from the fuel gas supply source 91. The first orifice member 33, the second orifice member 36, and the third orifice member 37 each include a passage hole (orifice), and regulate the flow rate of the fuel gas circulating through the fuel gas supply passage 30. The fuel gas blower 38 operates to supply (pressure feed) the fuel gas to the vaporizer 21.

The desulfurizer 39 is configured to remove a sulfur compound (that is, a sulfur component contained in the fuel gas) from the fuel gas by a hydrodesulfurization method. A catalyst and a superhigh-order desulfurizing agent are stored inside the desulfurizer 39. Hydrogen sulfide is generated by reacting the sulfur compound contained in the fuel gas with hydrogen inside the desulfurizer 39 (that is, in the presence of a catalyst). The superhigh-order desulfurizing agent takes in the generated hydrogen sulfide. As a result, the sulfur component is removed from the fuel gas. As the catalyst, a nickel-molybdenum catalyst, a cobalt-molybdenum catalyst, or the like is used. As the superhigh-order desulfurizing agent, for example, a copper-zinc desulfurizing agent, a copper-zinc-aluminum desulfurizing agent, or the like is used.

The recirculation system 4 is configured to introduce a part of the anode gas generated in the reformer 22 into the desulfurizer 39. The recirculation system 4 includes a recirculation passage 41, a trap 42, and a fourth orifice member 43.

The recirculation passage 41 is a passage for introducing the anode gas containing hydrogen generated in the reformer 22 into the desulfurizer 39. A first end of the recirculation passage 41 is connected to the outlet side of the reformer 22. Specifically, in FIG. 1, the first end of the recirculation passage 41 is connected to the anode gas supply passage 27 connected to the outlet side of the reformer 22. A second end of the recirculation passage 41 is connected to a portion of the fuel gas supply passage 30 between the fuel gas blower 38 and the regulating valve 32. Specifically, in FIG. 1, the second end of the recirculation passage 41 is connected to the fuel gas supply passage 30 at a portion between the second orifice member 36 and the third orifice member 37 provided in the fuel gas supply passage 30.

The trap 42 and the fourth orifice member 43 are provided on the recirculation passage 41 in this order from the first end portion on the side close to the reformer 22, that is, from the upstream side. The trap 42 is a self-operated valve for automatically discharging condensed water (drain) from the inside of the recirculation passage 41. The fourth orifice member 43 regulates the flow rate of the anode gas flowing through the recirculation passage 41. The details of the fourth orifice member 43 will be described below.

The air supply system 6 is configured to be capable of supplying air that is a cathode gas to the fuel cell 20 (accurately, to be capable of supplying air to the air passage of the manifold 25). The air supply system 6 includes an air supply passage 61, an air filter 62, an air blower 63, and an air flow meter 64. A first end of the air supply passage 61 is connected to the air passage of the manifold 25. A second end of the air supply passage 61 communicates with the outside air. The air filter 62 is provided at the second end of the air supply passage 61. The air blower 63 and the air flow meter 64 are arranged on the air supply passage 61. The air blower 63 is configured to operate to suck air (outside air) into the air supply passage 61 through the air filter 62 and to supply (pressure feed) the sucked air to the air passage of the manifold 25. The air flow meter 64 is configured to measure the flow rate of air flowing through the air supply passage 61 per unit time and to transmit the measurement result to the control device 85.

The reformed water supply system 5 is configured to supply the reformed water to the vaporizer 21. The reformed water supply system 5 includes a reformed water tank 51, a condensed water passage 52, a reformed water supply passage 53, and a reformed water pump 54. The condensed water passage 52 is connected to the exhaust gas passage of the heat exchanger 73 described below at a first end thereof and to the reformed water tank 51 at a second end thereof. Thus, the condensed water passage is configured such that the condensed water generated in the heat exchanger 73 flows into the reformed water tank 51. The reformed water tank 51 is configured so that the condensed water flowed in through the condensed water passage 52 can be stored as reformed water. Note that, inside the reformed water tank 51, a water purifier (not shown) for purifying the stored reformed water is arranged. The reformed water supply passage 53 is connected to the reformed water tank 51 at a first end thereof and to the vaporizer 21 at a second end thereof. The reformed water pump 54 is arranged on the reformed water supply passage 53. The reformed water pump 54 operates to supply (pressure feed) the reformed water stored inside the reformed water tank 51 to the vaporizer 21 through the reformed water supply passage 53.

The exhaust heat recovery system 7 includes a circulation passage 71, a circulation pump 72, and a heat exchanger 73. The circulation passage 71 is connected to the hot water storage tank 86 and the heat exchanger 73, and is configured so that hot water can be circulated between the hot water storage tank 86 and the heat exchanger 73. The circulation pump 72 is configured to operate to supply the hot water in the hot water storage tank 86 to the heat exchanger 73 and simultaneously to return the hot water heat-exchanged with the combustion exhaust gas in the heat exchanger 73 (that is, the heated hot water) to the hot water storage tank 86. The heat exchanger 73 includes a passage (exhaust gas passage) for the combustion exhaust gas discharged from the module case 24, and is configured to conduct heat exchange between the hot water circulating through the circulation passage 71 and the combustion exhaust gas discharged from the module case 24. The hot water storage tank 86 is configured to store hot water. The hot water storage tank 86 is connected to a water supply passage for receiving water supply from the outside and a hot water supply passage for supplying hot water to the outside, in addition to the circulation passage 71. In addition, a combustion catalyst 74 (also referred to as a cleaning catalyst) is arranged on the passage for the combustion exhaust gas from the module case 24 to the heat exchanger 73. Then, the unburned combustible component contained in the combustion exhaust gas is removed by catalytic combustion in the combustion catalyst 74. Further, the exhaust gas passage of the heat exchanger 73 is connected to the chimney 82 arranged outside the housing of the present system 1, via the exhaust passage 81.

The power conditioner 83 is configured to convert the direct current power output from the fuel cell 20 into an alternating current power having a predetermined voltage and to output the converted alternating current power. The power conditioner 83 is controlled by the control device 85. The power conditioner 83 includes a DC/DC converter (not shown) and an inverter. The DC/DC converter is electrically connected to the fuel cell 20 and boosts the voltage of the direct current power output from the fuel cell 20 to a predetermined voltage. The inverter converts the direct current power output from the DC/DC converter into alternating current power. The output terminal of the power conditioner 83 is configured to be connectable to the power wiring connected to the system power supply 92 (power supply supplied from the commercial distribution line network). In addition, the present system 1 is configured so that the direct current power generated in the fuel cell 20 can be converted into alternating current power and supplied to the load 93 of the home electric appliance or the like, in the state where the power conditioner 83 is connected to the system power supply 92.

The power supply device 84 converts the alternating current power supplied from the system power supply 92 and the power conditioner 83 into direct current power, and supplies the converted direct current power to each part (each auxiliary equipment) of the present system 1 such as the control device 85, the inlet solenoid valve 31, the fuel gas blower 38, and the air blower 63. The power supply device 84 includes an AC/DC converter that converts the alternating current power supplied from the system power supply 92 into direct current power.

The control device 85 includes a computer having a CPU, ROM, RAM, and I/F. The control device 85 is connected, via an I/F, to an inlet solenoid valve 31, a fuel gas flow meter 34, a fuel gas blower 38, an air flow meter 64, an air blower 63, a spark plug 23, a reformed water pump 54, a circulation pump 72, and the power conditioner 83. Further, the control device 85 acquires the measurement result of the fuel gas by the fuel gas flow meter 34 and the measurement result of the air flow rate by the air flow meter 64, and also controls the inlet solenoid valve 31, the fuel gas blower 38, the air blower 63, and the spark plug 23, the reformed water pump 54, the circulation pump 72, and the power conditioner 83.

Next, an outline of the operation of the present system 1 will be described. When the fuel gas blower 38 operates, the portion of the fuel gas supply passage 30 between the regulating valve 32 and the fuel gas blower 38 is under negative pressure. Thus, the regulating valve 32 is opened, and fuel gas is supplied from the external fuel gas supply source 91 to the desulfurizer 39 through the fuel gas supply passage 30. Further, the fuel gas blower 38 operates to supply the anode gas containing hydrogen to the desulfurizer 39 through the recirculation passage 41 and the fuel gas supply passage 30 (described below).

The fuel gas desulfurized in the desulfurizer 39 flows into the vaporizer 21. In addition, the reformed water pump 54 operates to supply the reformed water stored in the reformed water tank 51 to the vaporizer 21. The preheated fuel gas and the generated water vapor in the vaporizer 21 are mixed with each other and flow into the reformer 22 as mixed gas. Then, in the reformer 22, an anode gas containing hydrogen is generated by the reaction with the mixed gas of the fuel gas and water vapor.

The anode gas generated in the reformer 22 is supplied to the anode gas supply passage 27, the anode gas passage of the manifold 25, and the anode gas passage provided on the anode electrode side of each cell of the fuel cell 20. Meanwhile, the air blower 63 of the air supply system 6 operates to supply air (cathode gas) to the air passage provided on the cathode electrode side of each cell of the fuel cell 20 through the air supply passage 61 and the air passage of the manifold 25. Then, oxide ions ($O_2^-$) are generated at the cathode electrode of each cell, and the generated oxide ions penetrate through the solid electrolyte and react with hydrogen and carbon monoxide in the anode gas at the anode electrode to obtain direct current power. The obtained direct current power is output to the power conditioner 83.

The anode gas and air that are not used for generating electricity (electrochemical reaction) (referred to as "anode off gas" and "cathode off gas", respectively) in the cell stack of the fuel cell 20 flow out to the outside of the fuel cell 20 through the anode gas passage and the air passage of each cell, respectively. The anode off gas flowed out the outside of the fuel cell 20 through the anode gas passage of each cell and the cathode gas flowed out the outside of the fuel cell 20 through the air passage of each cell are mixed in the combustion part 26. Then, the anode off gas burns in the combustion part 26. Combustion of the anode off gas generates heat used for each of the operation of the fuel cell 20, the preheating of the fuel gas and the generation of water vapor in the vaporizer 21, and the water vapor reforming reaction in the reformer 22.

Combustion exhaust gas containing water vapor is generated in the combustion part 26 with the combustion of the anode off gas. The water content in the generated combustion exhaust gas is removed by the heat exchanger 73. The fuel exhaust gas from which the water content has been removed is discharged to the atmosphere through the exhaust passage 81 and the chimney 82.

A part of the anode gas generated in the reformer 22 flows into the fuel gas supply passage 30 through the recirculation passage 41 and is introduced into the desulfurizer 39 together with the fuel gas. Specifically, the operation is as follows. The second end of the recirculation passage 41 is connected to a portion of the fuel gas supply passage 30 between the fuel gas blower 38 and the regulating valve 32. Thus, when the fuel gas blower 38 operates to make the portion of the fuel gas supply passage 30 under negative pressure, a part of the anode gas generated in the reformer 22 is sucked into the recirculation passage 41 and then flows into the fuel gas supply passage 30. The anode gas flowed into the fuel gas supply passage 30 is supplied to the desulfurizer 39 in a state of being mixed with the fuel gas. Then, in the desulfurizer 39, the sulfur compound contained in the fuel gas reacts with the hydrogen contained in the anode gas to generate hydrogen sulfide, and the generated hydrogen sulfide is removed by the superhigh-order desulfurizing agent. Therefore, the fuel gas desulfurized in the desulfurizer 39 is supplied to the vaporizer 21 and the reformer 22.

Figure 2:
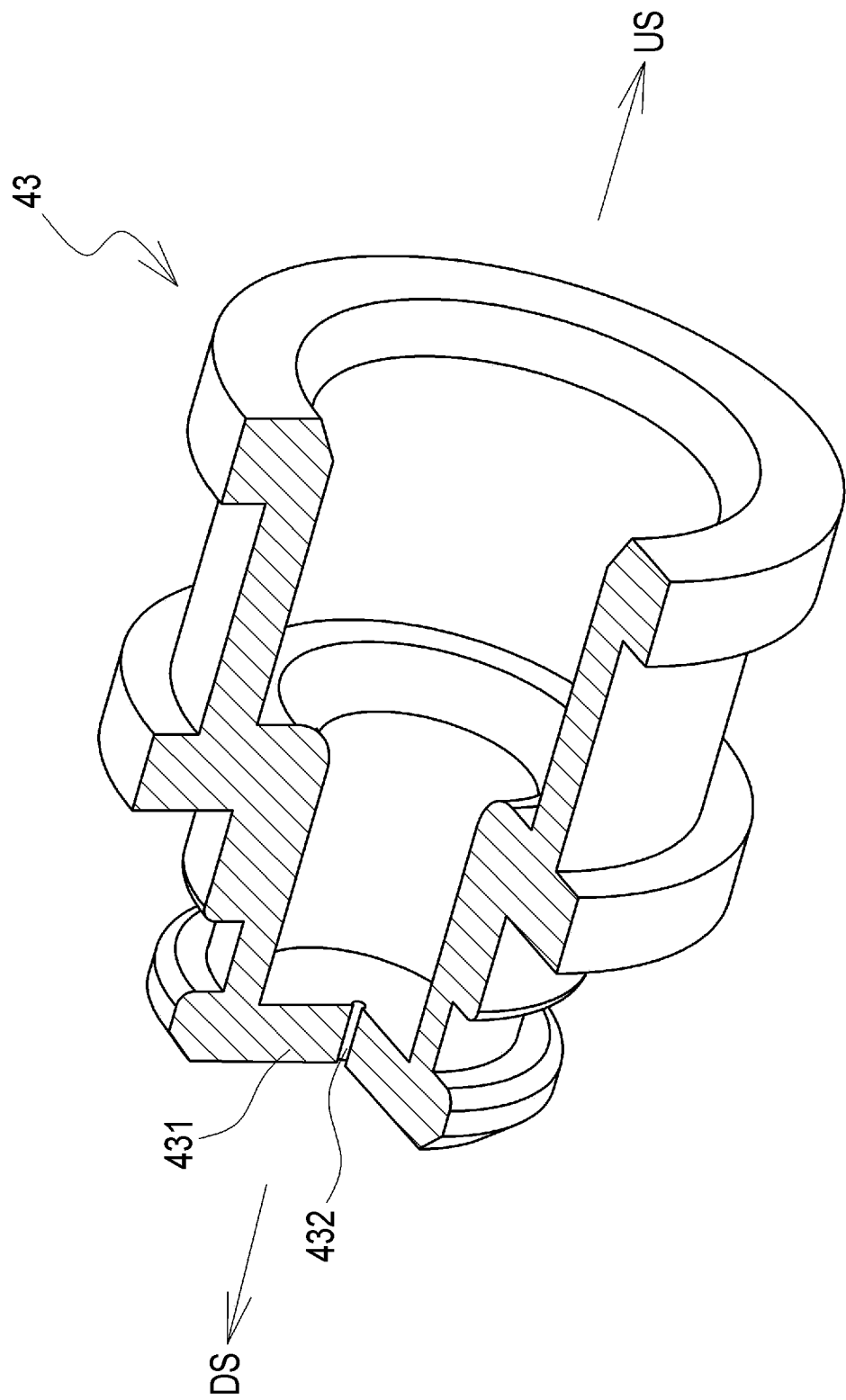
FIG. 2 is a diagram showing a configuration of an orifice.

Next, the fourth orifice member 43 provided in the recirculation passage 41 of the recirculation system 4 will be described. The fourth orifice member 43 is provided on the recirculation passage 41 in order to regulate the flow rate of the gas flowing through the recirculation passage 41. FIG. 2 is a diagram showing the configuration of the fourth orifice member 43. In FIG. 2, the arrow US indicates the upstream side of the gas flow in the recirculation passage 41, and the arrow DS indicates the downstream side thereof. As shown in FIG. 2, the fourth orifice member 43 has a substantially cylindrical shape with a hollow inside. A plate-shaped partition wall part 431 is provided at one end portion (downstream end portion) in the axial direction. Thus, the fourth orifice member 43 has a bottomed cylindrical shape as a whole. In addition, the partition wall part 431 is provided with a passage hole 432 (orifice) penetrating in the axial direction. The passage hole 432 is a hole (throttle) for regulating the flow rate of the anode gas passing through the fourth orifice member 43, and is smaller in inner diameter (in other words, a cross-sectional area perpendicular to the direction of the flow of the anode gas in the internal space) than the recirculation passage 41 and the other part of the fourth orifice member 43. That is, the passage hole 432 is the narrowest flow passage in the recirculation passage 41. As an example, the passage hole 432 is a circular through hole having a diameter of 0.3 mm. However, the cross-sectional area, length, and shape of the passage hole 432 are appropriately set according to the desired flow rate of the anode gas or the like, and are not specifically limited.

The fourth orifice member 43 is made of a glass fiber reinforced resin. Polyphenylene sulfide resin (PPS resin) is applied to the base material (matrix) of the glass fiber reinforced resin. Further, the glass fiber reinforced resin constituting the fourth orifice member 43 contains an antifungal material. That is, the fourth orifice member 43 is made of a material containing an antifungal material. Glass powder containing metal ions is applied to the antifungal material. In the present embodiment, a silver ion-based glass powder containing silver ions is applied to the antifungal material.

In the silver ion-based glass powder, silver ions are incorporated into the glass powder. When the glass powder comes into contact with water, the silver ions are gradually dissolved from the glass powder into water to obtain an antifungal action. The silver ions in the silver ion-based glass powder are favorably blended in the glass powder in a proportion of 0.01% to 5% by mass. In addition, the glass component of the silver ion-based glass powder contains favorably a phosphate glass component or a borate glass component as a main component. That is, the antifungal material is favorably made of silver ion-containing phosphate glass, silver ion-containing borate glass, or both of them. In such case, the content of a $P_2O_5$ glass component is favorably about 40 mol % to 75 mol % and the content of a $B_2O_3$ glass component is favorably about 1 mol % to 10 mol %, in the glass component.

A blending amount of the antifungal material (silver ion-based glass powder) with respect to the glass fiber reinforced PPS resin constituting the fourth orifice member 43 is preferably 2 parts by mass or more and 44 parts by mass or less, more preferably 3 parts by mass or more and 40 parts by mass or less, and still more preferably 4 parts by mass or more and 30 parts by mass or less, based on 100 parts by mass of the glass fiber reinforced PPS resin.

In the case where silver ion-based glass powder is used as the antifungal material in the fourth orifice member 43, when condensed water of water vapor adheres to the inner peripheral surface (inner wall) of the fourth orifice member 43, the silver ions included in the antifungal material are eluted in the condensed water. Then, the silver ions eluted in the condensed water exhibit an antifungal action. Therefore, the proliferation of mold on the inner peripheral surface of the fourth orifice member 43 is prevented or suppressed.

In order to effectively obtain the antifungal action described above, the fourth orifice member 43 is preferably configured such that the antifungal material (silver ion-based glass powder) is exposed on the inner peripheral surface (the surface through which the gas passes in the recirculation passage 41) of the fourth orifice member 43.

The fourth orifice member 43 can be molded by injection molding by using, for example, a raw material prepared by mixing glass fiber reinforced PPS resin pellets and silver ion-based glass powder at a predetermined ratio. Thereby, the silver ion-based glass powder is entangled with the glass fibers in the resin pellet during injection molding, so that the silver ion-based glass powder is uniformly dispersed in the fourth orifice member 43 to be molded. Therefore, the silver ion-based glass powder that is an antifungal material can be exposed on the inner peripheral surface of the fourth orifice member 43, particularly on the inner peripheral surface of the passage hole 432.

Since the fourth orifice member 43 is configured as described above, the blockage of the passage hole 432 by the proliferation of mold inside the passage hole 432 is prevented or suppressed. For example, in a case where a test operation of the present system 1 is performed after production and before shipment, the water vapor discharged from the reformer 22 may condense inside the recirculation passage 41 to generate condensed water. In the recirculation passage 41, condensed water condensed on the upstream side from the trap 42 is removed by being trapped by the trap 42; however, condensed water not trapped by the trap 42 and condensed water condensed on the downstream side of the trap 42 reach the fourth orifice member 43 and may adhere to the passage hole 432 of the fourth orifice member 43. Since the inside of the passage hole 432 of the fourth orifice member 43 has a small diameter, condensed water tends to be accumulated inside the passage hole 432 due to surface tension. Then, the fuel gas supply passage 30 may be opened to the atmosphere between the time when the present system 1 is shipped and the time when the present system 1 is installed at the site of use. At such time, oxygen and mold may invade the inside of the recirculation passage 41 through the fuel gas supply passage 30. As a result, the invaded oxygen and the condensed water accumulated in the passage hole 432 of the fourth orifice member 43 may cause mold to proliferate inside the passage hole 432, and the proliferation of mold may block the passage hole 432. Then, the blockage of the passage hole 432 reduces the amount of hydrogen introduced into the desulfurizer 39 through the recirculation passage 41, so that the fuel gas is insufficiently desulfurized in the desulfurizer 39. As a result, the fuel cell 20 deteriorates due to sulfur poisoning by the sulfur component contained in the fuel gas.

On the other hand, in the present system 1, the fourth orifice member 43 arranged on the recirculation passage 41 is formed of a material containing an antifungal material. Thus, when the condensed water is accumulated inside the passage hole 432, the silver ions contained in the antifungal material are eluted into the condensed water, and the eluted silver ions exhibit an antifungal action. Then, since the antifungal action prevents or suppresses the proliferation of mold inside the passage hole 432, the blockage of the passage hole 432 by the proliferation of mold is prevented or suppressed. Therefore, the decrease of the amount of hydrogen supplied from the reformer 22 to the desulfurizer 39 is prevented, and the deterioration of the performance to desulfurize the fuel gas in the desulfurizer 39 is prevented or suppressed. Thus, the deterioration of the fuel cell 20 due to sulfur poisoning is prevented or suppressed.

In the present embodiment, the entire fourth orifice member 43 is formed of a material containing an antifungal material; however, the fourth orifice member 43 is not limited to such a configuration. In the case where at least the inner peripheral surface (inner wall) of the passage hole 432 is formed of a material containing an antifungal material (in other words, the material containing the antifungal material is exposed on the inner peripheral surface of the passage hole 432), the above effect can be achieved. For example, a layer or a film of a material containing an antifungal material may be provided on the inner peripheral surface of the passage hole 432. In addition, the fourth orifice member 43 may be configured such that the portion provided with the passage hole 432 in the fourth orifice member 43 is formed of a material containing an antifungal material, and the other portion is formed of a material not containing an antifungal material. As described above, the fourth orifice member 43 may be in any configuration such that at least the inner peripheral surface of the passage hole 432 is formed of a material containing an antifungal material, in other words, such that the material containing an antifungal material is exposed on at least the inner peripheral surface of the passage hole 432.

Further, at least a part of the inner peripheral surface (inner wall) of the portion forming the side close to the reformer 22 from the fourth orifice member 43 (that is, the upstream side from the fourth orifice member 43) in the recirculation passage 41 may be made of a material containing an antifungal material, in addition to or in place of the configuration in which the fourth orifice member 43 is formed of a material containing an antifungal material. For example, the recirculation passage 41 may be formed of a material containing an antifungal material, and a film made of a material containing an antifungal material may be provided on the inner peripheral surface of the recirculation passage 41.

With such a configuration, the proliferation of mold on the side close to the reformer 22 from the fourth orifice member 43 on the inner peripheral surface of the recirculation passage 41 (that is, on the upstream side from the fourth orifice member 43 in the recirculation passage 41) is prevented or suppressed. Thus, since the mold inside the recirculation passage 41 can be reduced, the proliferation of mold inside the passage hole 432 of the fourth orifice member 43 is prevented or suppressed. Further, the occurrence of a situation that "mold proliferates on the side close to the reformer 22 from the fourth orifice member 43 (on the upstream side from the fourth orifice member 43) on the inner peripheral surface of the recirculation passage 41, and the proliferated mold reach the fourth orifice member 43 and block the passage hole 432" is prevented or suppressed.

As described above, the fourth orifice member 43 or the recirculation passage 41 may be in any configuration such that the fourth orifice member 43 or at least a part of the inner peripheral surface (inner wall) of the portion that constitutes the upstream side from the fourth orifice member 43 (the side close to the reformer 22 from the fourth orifice member 43) in the recirculation passage 41 is made of a material containing an antifungal material.

Although the embodiment of the present disclosure has been described above, the present disclosure is not limited to the embodiment described above. The present disclosure can be modified in various ways without departing from the gist of the present disclosure, and the modification is also included in the technical scope of the present disclosure.

Further, in the above embodiment, the PPS resin and other resins may be blended and used as the base material of the glass fiber reinforced resin of the fourth orifice member 43. The resin capable of being blended is not particularly limited; however, specific examples thereof include a thermoplastic elastomer. More specific examples thereof include copolymers that may have a glycidyl group and that contain ethylene and/or propylene as a main component, such as an ethylene-propylene copolymer, an ethylene-butene copolymer, an ethylene-octene copolymer, an ethylene-propylene-butene copolymer, an ethylene-propylene-diene copolymer, an ethylene-ethylacrylate copolymer, an ethylene-vinyl acetate copolymer, and an ethylene-glycidyl methacrylate copolymer.

Further, in the above embodiment, as regards the base material of the glass fiber reinforced resin of the fourth orifice member 43, an alkoxysilane compound having at least one functional group selected from a glycidyl group, an amino group, an isocyanate group, a hydroxyl group, a mercapto group, or a ureido group, may be added to PPS resin.

For example, in the above embodiment, the PPS resin is represented as the base material of the glass fiber reinforced resin of the fourth orifice member 43; however, the material of the base material is not limited to the PPS resin. Examples of the material used as a base material include polypropylene (PP) resin and polyphenylene ether (PPE) resin. Further, silver ion-based glass powder is represented as an antifungal material exhibiting an antifungal action; however, the antifungal material is not limited to silver ion-based glass powder. Various known antifungal materials can be applied to the antifungal material. In addition, an inorganic antifungal material is desired as the antifungal material.

Furthermore, in the above embodiment, as regards the base material of the glass fiber reinforced resin of the fourth orifice member 43, the resin described above may contain a known additive, such as an antioxidant, a weather-resistant stabilizer, a molecular weight regulator, an ultraviolet absorber, an antistat, a dye, a pigment, a lubricant, a crystallization accelerator, a crystal nucleating agent, a near-infrared absorber, a flame retardant, a flame retardant auxiliary, and a colorant, as needed.

In addition, in the above embodiment, the fourth orifice member 43 has a substantially cylindrical shape; however, the shape of the fourth orifice member 43 is not limited to the shape described above. For example, the fourth orifice member 43 may be an orifice plate in which a passage hole 432 (orifice) penetrating in the thickness direction is formed. In short, the fourth orifice member 43 may be in any configuration to be provided with a passage hole 432 for regulating the flow rate of the anode gas circulating through the recirculation passage 41 (that is, a portion smaller in inner diameter than other portions).

Further, in the above embodiment, the first end of the recirculation passage 41 is configured to be connected to the outlet side of the reformer 22; however, the embodiment is not limited to such a configuration. The first end of the recirculation passage 41 may be directly connected to the reformer 22, or may be connected to the anode gas supply passage 27 connected to the outlet of the reformer 22. In addition, a connection position with the second end of the recirculation passage 41 on the fuel gas supply passage 30 is not limited to the position represented in the embodiment. In short, the recirculation passage 41 may be in any configuration so that a part of the anode gas generated in the reformer 22 can be introduced into the desulfurizer 39.

In addition, each structure of the passages included in the present system 1 such as the recirculation passage 41 and the fuel gas supply passage 30 is not particularly limited. Each of the passages may be formed of a piping member (hard pipe, flexible hose, and the like) and may be formed of a member, such as a manifold, with a hollow inside such that a fluid can circulate.

What is claimed is:

1. A fuel cell system comprising:
a reformer configured to generate an anode gas containing hydrogen by reacting fuel gas with water vapor;
a fuel gas passage for supply of the fuel gas to the reformer;
a fuel cell configured to generate electricity by electrochemically reacting oxygen with the anode gas generated by the reformer;
a desulfurizer provided on the fuel gas passage and configured to desulfurize the fuel gas flowing through the fuel gas passage using hydrogen;
a recirculation passage through which the reformer communicates with the desulfurizer such that a part of the anode gas generated in the reformer flows into the desulfurizer; and
an orifice member provided on the recirculation passage, wherein the orifice member or at least a part of an inner wall of a portion that constitutes an upstream side from the orifice member in the recirculation passage is made of a material containing a material having an antifungal action.

2. The fuel cell system according to claim 1, wherein the orifice member is made of the material containing the material having the antifungal action.

3. The fuel cell system according to claim 2, wherein the orifice member is made of a glass fiber reinforced resin containing the material having the antifungal action.

4. The fuel cell system according to claim 3, wherein the material having the antifungal action is made of glass powder containing silver ions.

\* \* \* \* \*